(12) United States Patent
Koshimizu

(10) Patent No.: US 8,984,312 B2
(45) Date of Patent: Mar. 17, 2015

(54) SYSTEM AND METHOD TO CONTROL OPERATIONS OF AN INFORMATION PROCESSING DEVICE UPON DETECTING AN OPEN OR CLOSED STATE OF BATTERY LID AND REMAINING BATTERY CHARGE

(75) Inventor: Takashi Koshimizu, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 323 days.

(21) Appl. No.: 13/541,779

(22) Filed: Jul. 5, 2012

(65) Prior Publication Data

US 2013/0013942 A1    Jan. 10, 2013

(30) Foreign Application Priority Data

Jul. 8, 2011 (JP) ................... 2011-152184
Jun. 14, 2012 (JP) ................... 2012-134693

(51) Int. Cl.
*G06F 1/26* (2006.01)
*G06F 1/32* (2006.01)

(52) U.S. Cl.
CPC ............ *G06F 1/3206* (2013.01); *G06F 1/3203* (2013.01); *Y02B 60/1217* (2013.01)
USPC ............. 713/320; 713/324; 307/66; 320/118

(58) Field of Classification Search
CPC .......................... G06F 1/3203; Y02B 60/1217
See application file for complete search history.

(56) References Cited

U.S. PATENT DOCUMENTS

| | | | |
|---|---|---|---|
| 8,660,619 B2* | 2/2014 | Kil et al. ................. | 455/574 |
| 2002/0035703 A1* | 3/2002 | Konaka ................. | 713/330 |
| 2009/0040672 A1* | 2/2009 | Chishima ............... | 361/63 |
| 2009/0284225 A1* | 11/2009 | Nakanuma et al. ...... | 320/134 |

FOREIGN PATENT DOCUMENTS

| | | |
|---|---|---|
| JP | H05-127786 A | 5/1993 |
| JP | H05-313794 A | 11/1993 |

* cited by examiner

*Primary Examiner* — Jaweed A Abbaszadeh
*Assistant Examiner* — Gayathri Sampath
(74) *Attorney, Agent, or Firm* — James W. Judge

(57) ABSTRACT

A first battery 102 is removably housed in a first battery housing unit 108, and a second battery 103 is removably housed in a second battery housing unit 110. When it is detected that a lid 107 or 109 that is used when the first battery 102 or the second battery 103 is replaced is in an open state, system control sections 113 and 114 start a restriction mode for restricting an operation of an information processing device 100 such that power consumption by the information processing device 100 is curtailed.

10 Claims, 4 Drawing Sheets

SYSTEM AND METHOD TO CONTROL OPERATIONS OF AN INFORMATION PROCESSING DEVICE UPON DETECTING AN OPEN OR CLOSED STATE OF BATTERY LID AND REMAINING BATTERY CHARGE

BACKGROUND OF THE INVENTION

1. Field of the Invention

The present disclosure relates to information processing devices provided with a plurality of batteries, and to methods for controlling information processing devices.

2. Description of the Background Art

Information processing devices that medical workers at medical-care sites or employees in establishments such as restaurants may use while carrying the devices around are available. Such information processing devices are provided with a plurality of batteries that may be used even as they are repeatedly charged. Accordingly, even in places without an AC (alternating current) power supply, the system main unit of the devices can be run by activating the batteries. Moreover, when the information processing devices are not being carried around, the batteries can be charged by being connected to an AC power supply.

When such an information processing device is used in the aforementioned work locations without being charged for a long time, the remaining battery charge drops. Therefore, it is necessary to replace some of the plurality of batteries with spare batteries without turning off the power supply (hot-swap). In that case, once a battery is pulled out, it is necessary to continue the operation of the system with the remaining batteries until the battery replacement is completed. In that interval of time, if the remaining battery charge is less than the power needed, the device systems will be momentarily disrupted.

Japanese Laid-open Patent Publication No. H5-313794 discloses adjusting system operations or consumed power if the remaining battery charge has fallen. Further, Japanese Laid-open Patent Publication No. H5-127786 discloses providing switching means for supplying power from an emergency battery to components of a computer if an abnormality has occurred while power is being supplied from the main battery.

SUMMARY OF THE INVENTION

However, neither of the above conventional technologies mentions prevention of momentary system disruption associated with battery replacement in an information processing device. That is, the conventional technologies do not allow battery replacement while an information processing device is being used.

The present disclosure provides an information processing device, and a method for controlling an information processing device, whereby the device's systems are kept from being momentarily disrupted when the battery is replaced.

An information processing device of the present disclosure is directed to an information processing device including: a first battery and a second battery, each being removable and replaceable; a first battery housing unit configured to house the first battery; a second battery housing unit configured to house the second battery; a lid part having a lid which is openable when the first battery or the second battery is replaced; a lid detection section configured to detect an open state of the lid of the lid part; and a system control section configured to control an operation of the information processing device, wherein when it is detected, by the lid detection section, that the lid of the lid part is in an open state, the system control section starts a restriction mode for restricting an operation of the information processing device such that power consumption by the information processing device is curtailed.

According to the present disclosure, it is possible to provide an information processing device that can curtail the power consumption by an information processing device by restricting operations of the information processing device such that the system is not momentarily disrupted at battery-replacement time, and a method for controlling an information processing device.

These and other objects, features, aspects, and advantages of the present disclosure will become more apparent from the following detailed description of the present disclosure when taken in conjunction with the accompanying drawings.

DESCRIPTION OF THE PREFERRED EMBODIMENTS

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicant provides the attached drawings and the following description so that those skilled in the art can fully understand this disclosure. Therefore, the drawings and description are not intended to limit the subject defined by the claims.

First Embodiment

Figure 1:
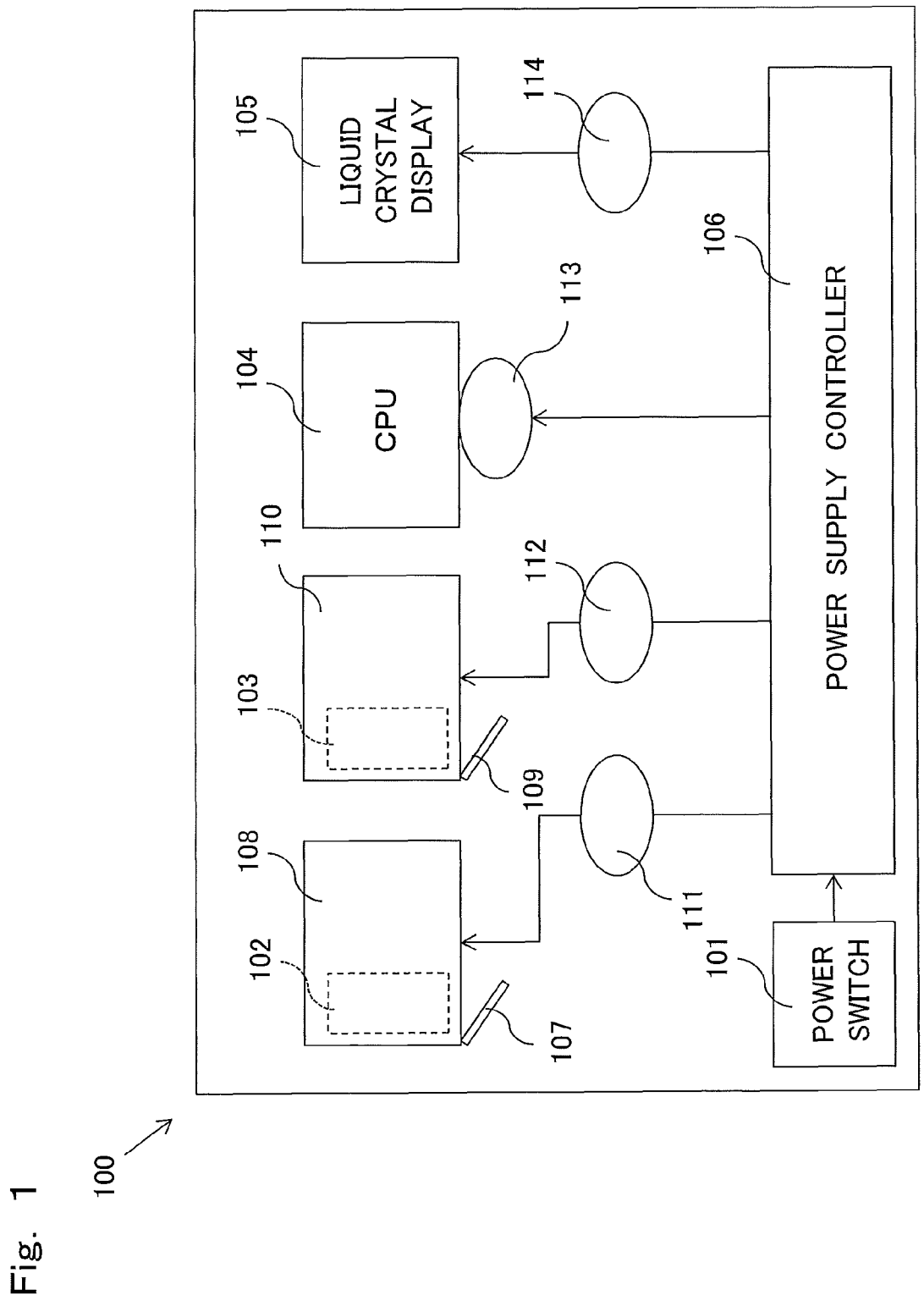
FIG. 1 is a schematic diagram showing a configuration of an information processing device according to an embodiment (first embodiment), as one mode of the present disclosure.

Hereinafter an information processing device 100 according to the present embodiment will be described with reference to the drawings. FIG. 1 is a schematic diagram showing a configuration of the information processing device 100 according to the present embodiment.

As shown in FIG. 1, the information processing device 100 according to the present embodiment includes a power switch 101, a first battery 102, a second battery 103, a CPU (central processing unit) 104, a liquid crystal display 105, and a power supply controller 106. In the information processing device 100, the first battery 102 is housed in a first battery housing unit 108 having a first lid 107 such that the first battery 102 can be inserted into and pulled out of the first battery housing unit 108, and the second battery 103 is housed in a second battery housing unit 110 having a second lid 109 such that the second battery 103 can be inserted into and pulled out of the second battery housing unit 110. The first battery 102 and the second battery 103 are provided so as to be removable and replaceable. The first lid 107 and the second lid 109 form a lid part. Further, the information processing device 100 includes a first detection section 111 configured to detect the first lid 107 being in an open state, a second detection section 112 configured to detect the second lid 109 being in an open state, a CPU control section 113 configured to increase and decrease the operating frequency of the CPU 104, and a liquid crystal display control section 114 configured to increase and decrease the backlight brightness of the liquid crystal display 105. The first detection section 111 and the second detection section 112 form a lid detection section that detects an open state of the lid 107 or 109 of the lid part. It should be noted that the information processing device 100 may include at least one of either the CPU control section 113 or the liquid crystal display control section 114. Hereinafter, the components will be described.

<The Power Switch 101>

The power switch 101 will be described. The power switch 101 is a switch for starting up the information processing device 100 according to the present embodiment. When the power switch 101 is turned on, the information processing device 100 is started up, and when the power switch 101 is turned off, the information processing device 100 stops. A conventional known switch mechanism may be employed for the power switch 101.

<The First Battery 102 and the Second Battery 103>

The first battery 102 and the second battery 103 will be described. The first battery 102 and the second battery 103 are batteries included in the information processing device 100 and function as a drive-power supply for driving the information processing device 100. As the batteries, aqueous batteries such as nickel-cadmium batteries and nickel-hydrogen batteries, or alternatively, non-aqueous electrolyte batteries such as lithium rechargeable batteries that can be quickly charged and that have high-volume energy density and high-weight energy density can be employed. The number of batteries is not particularly limited. The information processing device 100 may include a plurality of batteries, and in the present embodiment, includes the first battery 102 and the second battery 103. However, the number of batteries may be three or more. Further, the first battery 102 and the second battery 103 may be simultaneously used, or alternatively, one of the batteries may be used as a main battery and the other battery may be used as an auxiliary battery. Since the batteries 102 and 103 need to be appropriately monitored and controlled during charge and discharge, they are connected to a battery control board, not shown.

The batteries 102 and 103 are housed in the first battery housing unit 108 and the second battery housing unit 110, respectively. The first battery housing unit 108 is provided with the first lid 107 for holding the first battery 102 inside when the first lid 107 is closed. A first opening through which the first battery 102 is inserted and pulled out is formed in the first battery housing unit 108, and the first opening is opened and closed by the first lid 107. The first lid 107 is provided on an outer surface of the information processing device 100 and is opened when the first battery 102 is replaced. Meanwhile, the second battery housing unit 110 is provided with the second lid 109 for holding the second battery 103 inside when the second lid 109 is closed. A second opening through which the second battery 103 is inserted and pulled out is formed in the second battery housing unit 110, and the second opening is opened and closed by the second lid 109. The second lid 109 is provided on an outer surface of the information processing device 100 and is opened when the second battery 103 is replaced.

The information processing device 100 includes the first detection section 111, which is configured to detect whether the first lid 107 is in an open state or a closed state, and the second detection section 112, which is configured to detect whether the second lid 109 is in an open state or a closed state. As a detection mechanism for the first detection section 111, a detection mechanism can be employed that includes, for example, a magnet provided on the first lid 107, and a magnetic force detection unit provided near the first opening in the first battery housing unit 108 and configured to detect magnetic force. In this case, the first detection section 111 includes, in addition to the detection mechanism, a determination circuit connected to the magnetic force detection unit of the detection mechanism. This determination circuit determines the open or closed state of the first lid 107 based on an output signal from the magnetic force detection unit, and outputs the determination result to the power supply controller 106. When the magnetic force detection unit has detected magnetic force from the magnet (for example, when magnetic force detected by the magnetic force detection unit is greater than or equal to a determined determination value), the first detection section 111 detects that the first lid 107 is in a closed state, and when the magnetic force detection unit does not detect magnetic force from the magnet (for example, magnetic force detected by the magnetic force detection unit is less than the above determination value), the first detection section 111 detects that the first lid 107 is in an open state. The second detection section 112 employs the same detection mechanism and determination circuit as those in the first detection section 111. Alternatively, instead of the above detection mechanism, a detection mechanism or the like may be employed whereby current flows only when lids 107 and 109 are in closed states, and the flow of current is stopped when the lids 107 and 109 are in open states. By the provision of such detection mechanisms near the lids 107 and 109 and near the openings in the battery housing units 108 and 110, and by the provision of the determination circuits of the first detection section 111 and the second detection section 112, open or closed states of the lids 107 and 109 can be detected. It should be noted that the determination circuits may be built into the respective detection mechanisms.

Each of the first lid 107 and the second lid 109 includes, for example, a hinge, and is configured to be opened and closed by means of the hinge. The mechanisms of the first lid 107 and the second lid 109 are not limited in particular, and for example, latch mechanisms can be adopted to have the first lid 107 and the second lid 109 be latch lids. Further, the first lid 107 and the second lid 109 need not be opened and closed in a door-like manner, but the whole of the first lid 107 and the second lid 109 may be attachable to and detachable from the edges of the openings of the battery housing units 108 and 110.

<The CPU 104>

The CPU 104 will be described. The CPU 104 is provided so as to sequentially load, interpret, and execute programs stored in an auxiliary storage device (not shown) of the information processing device 100. By the CPU 104 being started up based on control by the power supply controller 106, bootup of systems such as the BIOS and the operation system (OS) is controlled.

Since the voltage to be consumed greatly differs depending on the operating frequency, the CPU 104 is controlled by the CPU control section 113 such that its operating frequency is curtailed as necessary. By performing such control during battery replacement, it is possible to effectively prevent the device systems (e.g., systems such as the BIOS, the operation system) from being momentarily disrupted when the battery is replaced.

<The Liquid Crystal Display 105>

The liquid crystal display 105 will be described. The liquid crystal display 105 is provided in order to display the startup state of the devices system. As the liquid crystal display 105, a conventional known display may be adopted; for example, a transparent liquid crystal display 105 or the like can be used. The transparent liquid crystal display 105 includes a planar lighting device called backlight (planar light source), and forms an image by subjecting illumination light from the backlight to spatial modulation using a liquid crystal panel.

Since the voltage consumed differs depending on the backlight brightness, the liquid crystal display 105 is controlled such that the backlight brightness is curtailed as necessary by the liquid crystal display control section 114. By performing such control during battery-replacement, it is possible to effectively prevent a phenomenon of the system being momentarily disrupted during battery replacement.

<The Power Supply Controller 106>

The power supply controller 106 will be described. The power supply controller 106 is provided in order to supply power of the batteries 102 and 103 to internal components included in the information processing device 100 after the power switch 101 is turned ON. In FIG. 1, the CPU 104, the liquid crystal display 105, and the like correspond to the internal components. Further, the power supply controller 106 is connected to the first detection section 111 configured to detect that the first lid 107 is in an open state, and to the second detection section 112 configured to detect that the second lid 109 is in an open state. Further, the power supply controller 106 is connected to the CPU control section 113 and the liquid crystal display control section 114. In a case where one of either a first condition that it is detected, by the first detection section 111, that the first lid 107 is in an open state; or a second condition that it is detected, by the second detection section 112, that the second lid 109 is in an open state is satisfied, the power supply controller 106 starts a restriction mode for restricting operations of the information processing device 100 such that the power consumption by the information processing device 100 is curtailed to lower than that in the state (for example, an ordinary operation state) immediately prior to the one of either the first condition or the second condition being satisfied. When starting the restriction mode, the power supply controller 106 outputs a restriction instruction to the CPU control section 113 and the liquid crystal display control section 114. Upon receiving the restriction instruction, the CPU control section 113 curtails the operating frequency of the CPU 104, and upon receiving the restriction instruction, the liquid crystal display control section 114 curtails the backlight brightness of the liquid crystal display 105. Through such a configuration, when one of either the first lid 107 or the second lid 109 is opened, the power supply controller 106 detects, using the detection sections 111 or 112, that the one of either the lids 107 or 109 has gone into the open state, curtails the operating frequency of the CPU 104, and curtails the backlight brightness of the liquid crystal display 105. Accordingly, even when a high voltage is applied to the other one of the batteries 102 and 103 that is not replaced at battery-replacement time, it is possible to suppress the system from being momentarily disrupted. It should be noted that when one of either the first condition or the second condition is satisfied, the power supply controller 106 may curtail only the operating frequency of the CPU 104, or only the backlight brightness of the liquid crystal display 105.

In the information processing device 100 according to the present embodiment, when the first battery 102 is to be replaced, for example, after the first battery 102 is pulled out, a spare battery is installed and then the first lid 107 is closed. Here, the power supply controller 106 may include a remaining battery charge detection section (not shown) configured to calculate, after the first lid 107 is closed, remaining battery charges of the first battery 102 and the second battery 103, respectively, and detects a total value thereof. In that case, the power supply controller 106 may include a curtailment stop section configured to end, when a total remaining battery charge detected by the remaining battery charge detection section is greater than or equal to a determined remaining battery charge determination value (for example, when 50% or more battery is remaining relative to 100% charge), the restriction mode for curtailing the operating frequency of the CPU 104 and the backlight brightness of the liquid crystal display 105, and configured to return the operating frequency of the CPU 104 and the backlight brightness of the liquid crystal display 105 to the states before the curtailment. Accordingly, when a battery having a sufficient remaining battery charge is installed, for example, the operating frequency of the CPU 104 and the backlight brightness of the liquid crystal display 105 return to the states before the curtailment. Accordingly, the user can intuitively understand that the batteries are in sufficiently charged states. On the other hand, in a case where the lid 107 is closed without installing the battery 102 when the user does not have a spare battery, or in a case where the lid 107 is closed with a battery 102 that is not sufficiently charged having been installed, the remaining battery charge detected by the remaining battery charge detection section may be lower than a determined remaining battery charge determination value. In such a case, the operating frequency of the CPU 104 and the backlight brightness of the liquid crystal display 105 do not return to the states before the curtailment, whereby it is possible to urge the user to replace batteries soon. It should be noted that the remaining battery charge detection section need not detect a total value of the remaining battery charge of the first battery 102 and the remaining battery charge of the second battery 103, but may detect the remaining battery charge of the first battery 102 and the remaining battery charge of the second battery 103, separately. In that case, the power supply controller 106 may determine, using of the first detection section 111 and the second detection section 112, which one of the batteries 102 and 103 is installed this time, and may end the restriction mode when the remaining battery charge of the battery 102 or 103 that is installed this time is greater than or equal to a determined remaining battery charge determination value. Further, the power supply controller 106 may end the restriction mode when at least one of either the remaining battery charge of the first battery 102 or the remaining battery charge of the second battery 103 is greater than or equal to a determined remaining battery charge determination value.

Moreover, the power supply controller 106 may include a discharge stop section configured to stop discharge, after it is detected that one of either the first lid 107 or the second lid 109 has entered an open state, from the battery 102 or 103 that is housed in the battery housing unit 108 or 110 having the lid 107 or 109 in an open state. That is, when the first lid 107 is opened in order to replace the first battery 102, power supply from the first battery 102 to internal devices of the information processing device 100 is stopped. Accordingly, it is possible to perform the battery replacement more safely.

Further, the power supply controller 106 may include a second remaining battery charge detection section (not shown) configured to detect, after it is detected that one of either the first lid 107 or the second lid 109 has entered an open state, a remaining battery charge of the other battery 102 or 103 that is housed in the battery housing unit 108 or 110 having the lid 107 or 109 in a closed state, and a notification section configured to notify the user of the remaining battery charge detected by the second remaining battery charge detection section. The notification section displays, for example, the remaining battery charge detected by the second remaining battery charge detection section. That is, when the first detection section 111 detects, for example, that the first lid 107 is opened, the second remaining battery charge detection section detects the remaining battery charge of the second battery 103 (the battery with the closed lid). Based on the detected remaining battery charge, the notification section displays the remaining battery charge in a determined display manner, so as to be viewable by the user. The notification section is provided in a part of the casing of the information processing device 100, so as to be viewable by the user. It should be noted that the notification section may be the liquid crystal display 105. In that case, the remaining battery charge of the second battery 103 detected by the second remaining battery charge detection section is displayed on the liquid crystal display 105. Further, in a manner different from a numerical display of the remaining battery charge, the user may be notified of the remaining battery charge of the battery 102 or 103 with the closed lid detected by the second remaining battery charge detection section. The notification section is not limited in particular, and a system such as lighting up an LED may be employed. Also, various types of lighting devices other than an LED may be illuminated. In that case, in accordance with the remaining battery charge detected by the second remaining battery charge detection section, the lighting periodicity may be varied, or the color of light illuminated may be varied. Further, along with the remaining battery charge, or instead of the remaining battery charge, available time remaining calculated from the remaining battery charge may be displayed.

Figure 2:
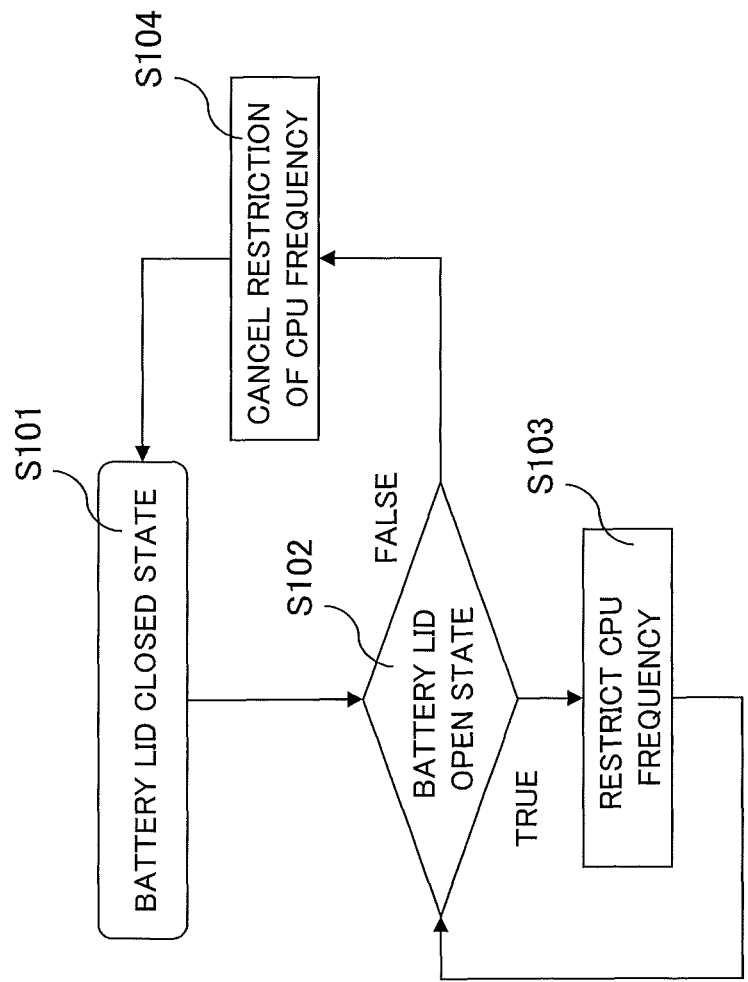
FIG. 2 is a flow chart showing a control flow of an information processing device according to an embodiment (first embodiment), as one mode of the present disclosure.
Figure 3:
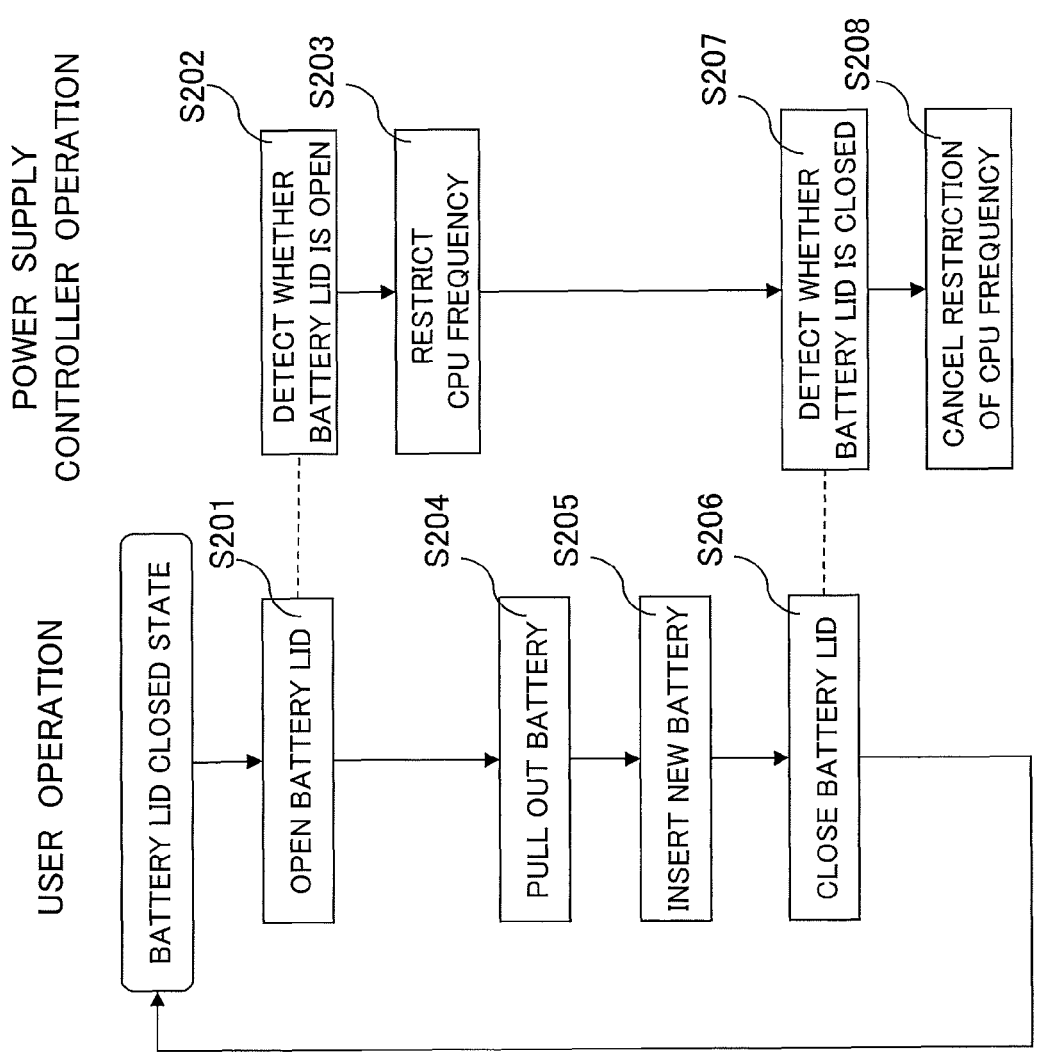
FIG. 3 is a flow chart illustrating a flow of battery replacement performed in an information processing device according to an embodiment (first embodiment), as one mode of the present disclosure.

The power supply controller 106 is realized by installing a program into an integrated circuit such as an LSI or one chip formed of dedicated signal processing circuits such that the flow charts shown in FIG. 2 and in the right part of FIG. 3 are performed. Here, the LSI in the present embodiment may be referred to as an IC, a system LSI, a super LSI, or an ultra LSI, depending on the degree of integration. Furthermore, the method for circuit integration is not limited to LSI, and may be realized by a dedicated circuit or a general-purpose processor. A field programmable gate array (FPGA) that can be programmable after manufacture of the LSI, or a reconfigurable processor that allows connection and settings of the circuit cells in the LSI may be used. Further, if a new circuit integration technology that replaces the LSI technology, or is developed based on a technology derived from the semiconductor technology, the functional blocks may, of course, be integrated using such a technology.

<Other Internal Components>

The information processing device 100 according to the present embodiment may include, in addition to the above-described internal devices, an auxiliary storage device such as an HDD (hard disk drive), an information storage medium reader such as a DVD (digital versatile disc) drive, a graphic board, a cooling fan, and the like, as other internal devices.

Hereinafter, a method for controlling the information processing device 100 of the present embodiment will be described. FIG. 2 is a flow chart showing a control flow of the information processing device 100 according to the present embodiment. FIG. 3 is a flow chart illustrating the flow of a battery replacement performed in the information processing device 100 according to the present embodiment.

As shown in FIG. 2, with respect to the information processing device 100 according to the present embodiment, the flow starts from a state where the first lid 107 and the second lid 109 are closed (step S101) and advances to step S102 where it is determined, by the first detection section 111 or the second detection section 112 controlled by the power supply controller 106, whether one of either the first lid 107 or the second lid 109 is in an open state, respectively. When it is detected in step S102, by the first detection section 111 or the second detection section 112, that one of either the first lid 107 or the second lid 109 is opened, respectively, the restriction mode is started and the operating frequency of the CPU 104 is curtailed by the CPU control section 113 (step S103). When step S103 ends, the flow returns to step S102. When it is detected in step S102 that the opened lid 107 or 109 is closed, the restriction mode ends and the operating frequency of the CPU 104 is returned to the state before the curtailment (step S104). It should be noted that FIG. 2 is a flow chart when the operating frequency of the CPU 104 is curtailed in the restriction mode. However, in step S103, along with the operating frequency of the CPU 104 or instead of the operating frequency of the CPU 104, the backlight brightness of the liquid crystal display 105 may be curtailed. In this case, the backlight brightness of the liquid crystal display 105 is returned to the state before the curtailment, in step S104. Further, in step S102 following step S101, when it is not detected that one of either the first lid 107 or the second lid 109 is opened, the flow advances to step S104. However, since the restriction mode is not set, the flow returns to step S101 without changing the operating frequency of the CPU.

Next, the flow of the battery replacement will be described. In a case where the user replaces the first battery 102 or the second battery 103, when one of either the first lid 107 or the second lid 109 is opened (step S201), it is detected, by the first detection section 111 or the second detection section 112 controlled by the power supply controller 106, that one of either the first lid 107 or the second lid 109 is opened (step S202), respectively, and the operating frequency of the CPU 104 is curtailed by the CPU control section 113 controlled by the power supply controller 106 (step S203). When the first battery 102 is to be replaced, for example, the first battery 102 is pulled out of the first battery housing unit 108 (step S204), and a new battery is installed as the first battery 102 in the first battery housing unit 108 (step S205). When the first lid 107 is closed by the user (step S206), it is detected, by the first detection section 111 controlled by the power supply controller 106, that the first lid 107 is closed (step S207), and the operating frequency of the CPU 104 is returned to the state before the curtailment (step S208). It should be noted that FIG. 3 is a flow chart when the operating frequency of the CPU 104 is curtailed in the restriction mode. However, in step S203, along with the operating frequency of the CPU 104, or instead of the operating frequency of the CPU 104, the backlight brightness of the liquid crystal display 105 may be curtailed. In this case, the backlight brightness of the liquid crystal display 105 is returned to the state before the curtailment, in step S208.

With respect to FIG. 3, description has been given of an exemplary case where that the lid 107 or 109 that was opened for the battery replacement is closed is detected by the detection section 111 or 112 that corresponds to the lid 107 or 109, and then the operating frequency of the CPU 104 is returned to the state before the curtailment. However, the present disclosure is not limited thereto. For example, whether the lid 107 or 109 that was opened for the battery replacement has been closed may be detected by the detection section 111 or 112 that corresponds to the lid 107 or 109, and then the remaining battery charge of the corresponding battery 102 or 103 that was newly installed in the restriction mode may be detected by the remaining battery charge detection section. In that case, when it is determined that the remaining battery charge detected by the remaining battery charge detection section is less than a determined remaining battery charge determination value, the operating frequency of the CPU 104 is controlled so as not to be returned to the state before the curtailment. Accordingly, when the remaining battery charge of the newly installed battery 102 or 103 is not sufficient, it is possible to prevent the operating frequency of the CPU 104 from returning to the state before the curtailment. For example, in a case where whether the lid 107 or 109 opened for the battery replacement is closed is detected by the detection section 111 or 112 that corresponds to the lid 107 or 109, and as a result of detection, by the remaining battery charge detection section, of the remaining battery charge of the newly-mounted battery (or a total value of the remaining battery charge of the first battery 102 and the remaining battery charge of the second battery 103), when the detected remaining battery charge is greater than or equal to 30%, the operating frequency of the CPU 104 may be returned to the state before the curtailment; whereas when the detected remaining battery charge is less than 30%, the operating frequency of the CPU 104 may not be returned to the state before the curtailment, and then, the notification section may indicate that the remaining battery charge is not sufficient yet. Accordingly, it is possible to notify the user that the remaining battery charge is not yet sufficient after the battery has been replaced.

Further, in the present embodiment, the operating frequency of the CPU 104 and the backlight brightness of the liquid crystal display 105 are curtailed in the restriction mode. However, it should be understood that operations of other internal components included in the information processing device 100 may be restricted such that the power consumption by the information processing device 100 is curtailed.

Further, in the present embodiment, the restriction mode is started, when it is detected that one of either the first lid 107 or the second lid 109 is in an open state, irrespective of the open or closed state of the other lid 107 or 109. However, when one of either the first lid 107 or the second lid 109 is in an open state and when the other lid is in a closed state, the restriction mode may be started. Further, also when both of the first lid 107 and the second lid 109 are in open states, the restriction mode may be performed. In that case, for example, the restriction mode may be started when that the first lid 107 is in an open state and that the second lid 109 is in an open state are simultaneously detected. Alternatively, after the restriction mode is started as a result of detection of one of either the first lid 107 or the second lid 109 being in an open state, if the other lid 107 or 109 in a closed state enters an open state, the restriction mode may be continued.

Second Embodiment

Figure 4:
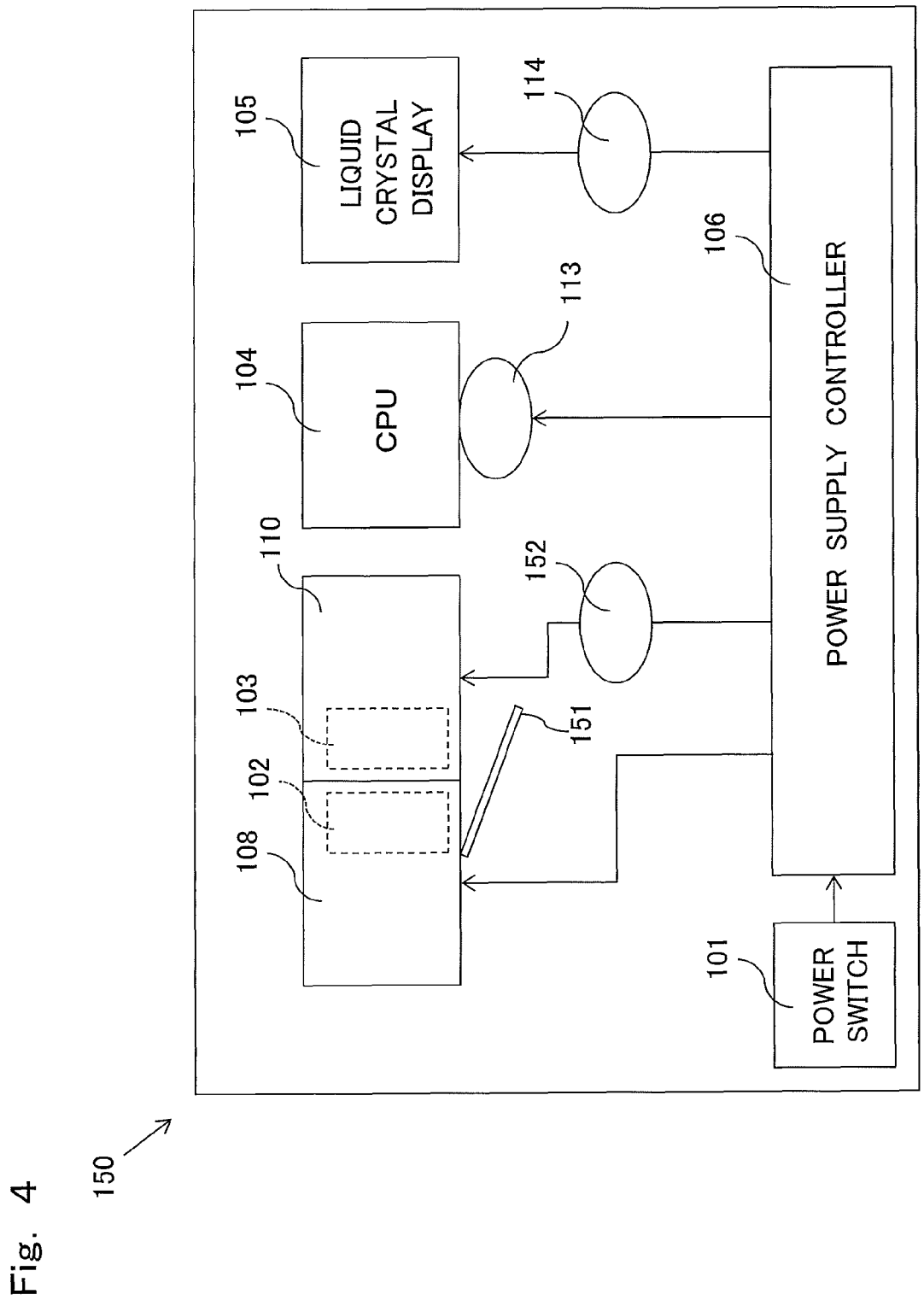
FIG. 4 is a schematic diagram showing a configuration of an information processing device according to an embodiment (second embodiment), as one mode of the present disclosure.

A second embodiment will be described. FIG. 4 is a schematic diagram showing a configuration of an information processing device 150 according to the present embodiment. In FIG. 4, the same components as those in the first embodiment are denoted by the same reference characters. Hereinafter, features different from those in the first embodiment will be described.

In the present embodiment, a lid part includes one lid 151 for causing the first battery 102 to be held inside the first battery housing unit 108 and for causing the second battery 103 to be held inside the second battery housing unit 110. The lid 151 is opened when the first battery 102 or the second battery 103 is replaced.

The information processing device 150 includes a detection section 152 (lid detection section) configured to detect an open or closed state of the lid 151. The same configuration as that for the first detection section 111 in the first embodiment may be employed for the detection section 152. The detection section 152 is connected to the power supply controller 106. In FIG. 4, the detection section 152 provided with a magnet and a magnetic force detection unit is provided to the second battery housing unit 110 side. However, the detection section 152 may be provided to the first battery housing unit 108 side.

In the information processing device 150 according to the present embodiment, when it is determined, by the detection section 152, that the lid 151 has entered from a closed state to an open state, the restriction mode is started, and the operating frequency of the CPU 104 is curtailed by the CPU control section 113. Then, when it is detected that the lid 151 is closed in the restriction mode, the restriction mode ends, and the operating frequency of the CPU 104 is returned to the state before the curtailment. It should be noted that in the restriction mode, along with the operating frequency of the CPU 104, or instead of the operating frequency of the CPU 104, the backlight brightness of the liquid crystal display 105 may be curtailed.

It should be noted that the restriction mode may be ended, not when the remaining battery charge after the battery replacement is not sufficient, but when a total value of the remaining battery charge of the first battery 102 and the remaining battery charge of the second battery 103 detected by the remaining battery charge detection section (or the remaining battery charge of the installed battery) is greater than or equal to a determined value. Further, after it is determined that the lid 151 is in an open state, a battery to be replaced is detected by a component other than the lid detection section, and then discharge from the detected battery may be stopped. In this case, for example, whichever of the first battery 102 and the second battery 103 that has less remaining battery charge may be detected as the battery to be replaced. Further, after it is detected that the lid 151 is in an open state, a battery that is not to be replaced is detected, and then the remaining battery charge of the detected battery may be notified to the user.

<Effect and the Like>

As described above, according to the information processing device, and to a method for controlling an information processing device, of the first and second embodiment, it is possible to provide an information processing device that can curtail the power consumption by an information processing device by restricting operations of the information processing device, so as to prevent the system from being momentarily disrupted.

As described above, in the first and second embodiment, the information processing device may further include a remaining battery charge detection section configured to detect remaining battery charges of the first battery 102 and the second battery 103, respectively.

Whereby, it is possible to determine whether there is a sufficient remaining battery charge after the battery replacement is performed. When the remaining battery charge is sufficient, operations, which have been restricted, of components of the information processing device can be returned to states before the restriction is performed. On the other hand, when the remaining battery charge is not sufficient, by continuing the restriction of operations of internal devices, it is possible to urge the user to perform the battery replacement again, and to prevent the system from being momentarily disrupted.

As described above, in the first and second embodiment, the restriction mode may be a mode for curtailing at least one of either an operating frequency of a CPU 104 of the information processing device, or a backlight brightness of a liquid crystal display 105 for the information processing device.

Whereby, it is possible to effectively suppress the system from being momentarily disrupted, at battery-replacement time.

As described above, in the first embodiment, the lid part includes a first lid 107 which is openable when the first battery 102 is replaced and a second lid 109 which is openable when the second battery 103 is replaced, the lid detection section includes a first detection section 111 configured to detect an open state of the first lid 107 and a second detection section 112 configured to detect an open state of the second lid 109, and when it is detected, by the first detection section 111, that the first lid 107 is in an open state or it is detected, by the second detection section 112, that the second lid 109 is in an open state, the system control section may start the restriction mode. For example, the information processing device may further include a power supply controller 106 configured to control supply of power from the first battery 102 and the second battery 103, wherein after it is detected, by the first detection section 111, that the first lid 107 is an open state, or it is detected, by the second detection section 112, that the second lid 109 is in an open state, the power supply controller 106 may stop discharge from that battery housed in the battery housing unit having the lid detected as being in the open state.

Whereby, it is possible to perform battery replacement more safely.

As described above, in the first embodiment, after it is detected, by the first detection section 111, that the first lid 107 is in an open state, or it is detected, by the second detection section 112, that the second lid 109 is in an open state, the remaining battery charge detection section may detect the remaining battery charge of that battery housed in the battery housing unit having the closed lid, which has not been detected as being in an open state; and the information processing device further may include a notification section configured to notify a user of the remaining battery charge of the battery corresponding to the closed lid, detected by the remaining battery charge detection section.

Whereby, even when the user does not have a spare battery, the user can intuitively understand how much time the user can continue to use the information processing device only with the remaining battery.

A method for controlling an information processing device according to the first and second embodiment is directed to a method for controlling, at a battery replacement, an information processing device in which a lid of a lid part is openable when a first battery 102 removably housed in a first battery housing unit 108 or a second battery 103 removably housed in a second battery housing unit 110 is replaced, the method including the step of: starting, when it is detected that the lid of the lid part is in an open state, a restriction mode for restricting an operation of the information processing device such that power consumption by the information processing device is curtailed.

Whereby, it is possible to provide a method for controlling of an information processing device that can suppress the system from being momentarily disrupted at battery-replacement time.

In the first and second embodiment, operation states of the above-described internal components of the information processing device 100 are controlled by their respective control sections (the CPU control section 113, the liquid crystal display control section 114, etc.). These control sections are collectively referred to as a system control unit.

As described above, embodiments have been described as examples of implementation in the present disclosure. Thus, the attached drawings and detailed description have been provided.

Therefore, in order to illustrate the implementation, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the implementation, it is understood that various modifications, replacements, additions, omissions, and the like can be performed in the scope of the claims or in an equivalent scope thereof.

What is claimed is:

1. An information processing device having a CPU and a liquid crystal display, the device comprising:
   a first battery and a second battery, each being removable and replaceable;
   a first battery housing unit configured to house the first battery;
   a second battery housing unit configured to house the second battery;
   a remaining battery charge detection section configured to detect remaining battery charges of the first battery and the second battery, respectively;
   a lid part having a lid which is openable when the first battery or the second battery is replaced;
   a lid detection section configured to detect an open state of the lid of the lid part; and
   a system control section configured to control an operation of the information processing device, and configured such that
     when it is detected, by the lid detection section, that the lid of the lid part is in an open state, the system control section enters a restriction mode in which the system control section reduces operating frequency of the CPU and backlight brightness of the liquid crystal display, and
     after it is detected, in the restriction mode, by the lid detection section, that the lid of the lid part is in a closed state, the system control section
     i. determines that a newly installed battery replaced during the restriction mode is sufficiently charged, ends the restriction mode, and restores the operating frequency of the CPU and the backlight brightness of the liquid crystal display to those before the restriction mode was started, either (a) when a total value of the remaining battery charge of the first battery and the remaining battery charge of the second battery, detected by the remaining battery charge detection section, is greater than or equal to a determined value, or (b) when a remaining battery charge of the newly installed battery, detected by the remaining battery charge detection section, is greater than or equal to a determined value, or ii. determines that a newly installed battery is not sufficiently charged and continues the restriction mode, either (a) when the total value of the remaining battery charge of the first and second batteries, detected by the remaining battery charge detection section, is less than the determined value, or (b) when the remaining battery charge of the newly installed battery, detected by the remaining battery charge detection section, is less than the determined value.

2. The information processing device according to claim 1, wherein
the lid part includes a first lid which is openable when the first battery is replaced and a second lid which is openable when the second battery is replaced,
the lid detection section includes a first detection section configured to detect an open state of the first lid and a second detection section configured to detect an open state of the second lid, and
when it is detected, by the first detection section, that the first lid is in an open state or it is detected, by the second detection section, that the second lid is in an open state, the system control section starts the restriction mode.

3. The information processing device according to claim 2, further comprising:
a power supply controller configured to control supply of power from the first battery and the second battery, wherein
after it is detected, by the first detection section, that the first lid is an open state, or it is detected, by the second detection section, that the second lid is in an open state, the power supply controller stops discharge from that battery housed in the battery housing unit having the lid detected as being in the open state.

4. The information processing device according to claim 2, wherein
after it is detected, by the first detection section, that the first lid is in an open state, or it is detected, by the second detection section, that the second lid is in an open state, the remaining battery charge detection section detects the remaining battery charge of that battery housed in the battery housing unit having the closed lid, which has not been detected as being in an open state; and
the information processing device further comprises
a notification section configured to notify a user of the remaining battery charge of the battery corresponding to the closed lid, detected by the remaining battery charge detection section.

5. A method for controlling, at a battery replacement, an information processing device that has a CPU and a liquid crystal display, and in which a lid of a lid part is openable when a first battery removably housed in a first battery housing unit or a second battery removably housed in a second battery housing unit is replaced, the method comprising the step of:
starting, when it is detected that the lid of the lid part is in an open state, a restriction mode to reduce operating frequency of the CPU and backlight brightness of the liquid crystal display;
detecting, in the restriction mode, after the lid of the lid part is detected to be in a closed state, remaining battery charges of the first battery and the second battery;

(i) when a total value of the remaining battery charge of the first battery and the remaining battery charge of the second battery, detected by the remaining battery charge detection section, is greater than or equal to a determined value, or when a remaining battery charge of a newly installed battery, detected by the remaining battery charge detection section, is greater than or equal to a determined value, determining that the newly installed battery replaced during the restriction mode is sufficiently charged, ending the restriction mode, and restoring the operating frequency of the CPU and the backlight brightness of the liquid crystal display to those before the restriction mode was started; and (ii) when a newly installed battery is determined not to be sufficiently charged, continuing the restriction mode.

6. The method for controlling the information processing device according to claim 5, wherein
the lid part includes a first lid which is openable when the first battery is replaced and a second lid which is openable when the second battery is replaced, and
when it is detected that one of either the first lid or the second lid is in an open state, a step of starting the restriction mode is performed.

7. The method for controlling the information processing device according to claim 6, wherein
after it is detected that one of either the first lid or the second lid is in an open state, a step of stopping discharge from that battery housed in the battery housing unit having the lid detected as being in the open state is performed.

8. The method for controlling the information processing device according to claim 6, wherein
after it is detected that one of either the first lid or the second lid is in an open state, a step of detecting a remaining battery charge of that battery housed in the battery housing unit having the lid not detected as being in an open state and displaying the detected remaining battery charge is performed.

9. The information processing device according to claim 1, further comprising a power supply controller configured to control supply of power from the first battery and the second battery, wherein:
the lid of the lid part is a single lid that holds the first battery inside the first battery housing unit and holds the second battery inside the second battery housing unit; and
after the lid of the lid part is detected to be in an open state by the lid detection section, the power supply controller stops discharge from whichever of the first battery and the second battery that has less remaining battery charge.

10. The method for controlling the information processing device according to claim 5, wherein:
the lid part includes a single lid that holds the first battery inside the first battery housing unit and holds the second battery inside the second battery housing unit, and
the method further comprising a step of, after the single lid is detected to be in an open state, detecting, as a battery to be replaced, whichever of the first battery and the second battery that has less remaining battery charge, and stopping discharge from the battery to be replaced.

* * * * *